US012304048B2

(12) United States Patent
Eto et al.

(10) Patent No.: US 12,304,048 B2
(45) Date of Patent: May 20, 2025

(54) HANDLE FOR USE WITH POWER TOOL

(71) Applicant: MAKITA CORPORATION, Anjo (JP)

(72) Inventors: Yu Eto, Anjo (JP); Yoshinori Sasaki, Anjo (JP); Luyen Van Tong, Anjo (JP)

(73) Assignee: MAKITA CORPORATION, Anjo (JP)

( * ) Notice: Subject to any disclaimer, the term of this patent is extended or adjusted under 35 U.S.C. 154(b) by 6 days.

(21) Appl. No.: 18/128,838

(22) Filed: Mar. 30, 2023

(65) Prior Publication Data

US 2023/0339089 A1 Oct. 26, 2023

(30) Foreign Application Priority Data

Apr. 22, 2022 (JP) ................................. 2022-070836

(51) Int. Cl.
*B25D 17/04* (2006.01)
*B25F 5/00* (2006.01)

(52) U.S. Cl.
CPC ............ *B25D 17/043* (2013.01); *B25F 5/006* (2013.01)

(58) Field of Classification Search
CPC .............................. B25D 17/043; B25F 5/006
See application file for complete search history.

(56) References Cited

U.S. PATENT DOCUMENTS

| | | | | |
|---|---|---|---|---|
| 8,813,868 B2 * | 8/2014 | Limberg | B25F 5/02 | 16/421 |
| 9,950,416 B2 * | 4/2018 | Kutsuna | B25F 5/006 | |
| 11,400,577 B2 * | 8/2022 | Furusawa | B25D 11/12 | |
| 2005/0087353 A1 * | 4/2005 | Oki | B25F 5/006 | 173/162.2 |
| 2007/0143966 A1 * | 6/2007 | Fischer | B25F 5/026 | 16/422 |
| 2008/0223593 A1 * | 9/2008 | Eicher | B25F 5/026 | 173/109 |
| 2011/0005790 A1 * | 1/2011 | Frank | B25F 5/006 | 16/421 |
| 2013/0025088 A1 * | 1/2013 | Weiss | B25F 5/006 | 16/431 |
| 2013/0185899 A1 * | 7/2013 | Zhang | B25D 17/043 | 16/431 |
| 2015/0328760 A1 * | 11/2015 | Ikuta | B25D 17/043 | 173/117 |
| 2016/0129579 A1 * | 5/2016 | Friedrich | B25D 17/043 | 173/162.2 |

FOREIGN PATENT DOCUMENTS

JP 2005-081517 A 3/2005

* cited by examiner

*Primary Examiner* — Lucas E. A. Palmer
(74) *Attorney, Agent, or Firm* — Oliff PLC

(57) ABSTRACT

A handle for use with a power tool includes a handle body, a beam and a weight. The handle body includes a mounting part and a grip part. The handle body is configured to be removably secured to a tool body of a power tool. The grip part is formed in an elongated hollow shape. The beam is supported by the handle body in a cantilever manner and extends within the grip part. The weight is supported by the beam.

18 Claims, 7 Drawing Sheets

HANDLE FOR USE WITH POWER TOOL

CROSS-REFERENCE TO RELATED APPLICATION

The present application claims priority to Japanese patent application No. 2022-070836 filed on Apr. 22, 2022, the contents of which are hereby fully incorporated herein by reference.

TECHNICAL FIELD

The present disclosure relates to a handle for use with a power tool, in particular, to a handle that is configured to be removably attached to a tool body of a power tool.

BACKGROUND

A handle is sometimes removably attached to a power tool and gripped by a user during an operation. For example, Japanese laid-open patent publication No. 2005-081517 discloses an auxiliary handle that is configured to be removably attached to (mounted on) an electric hammer. The auxiliary handle includes a handle body (a mounting part) to be attached to a barrel part of the power tool, and a grip part that is coupled to the handle body. One end of the grip part is pivotable in a hammering direction relative to the handle body. An elastic member (for example, spring or rubber) is interposed between the grip part and a portion of the handle body that is disposed within the grip part. Owing to pivoting movement of the grip part relative to the handle body and a vibration absorbing effect of the elastic member, the auxiliary handle achieves a vibration-isolating function in the hammering direction.

SUMMARY

In order to enhance the vibration-isolating effect of the above-described auxiliary handle, the spring constant of the elastic member may be set to a small value. On the other hand, such a small spring constant may deteriorate maneuverability of the auxiliary handle.

Accordingly, it is a non-limiting object of the present disclosure to provide an improved technique for reducing vibration of a handle that is configured to be removably attached to a tool body of a power tool.

One non-limiting aspect according to the present disclosure provides a handle for use with a power tool. Another non-limiting aspect according to the present disclosure provides a power tool that includes a tool body and a handle that is removably attached (mounted, coupled) to the tool body. In each of these aspects, the handle includes a handle body, a beam and a weight. The handle body includes a mounting part and a grip part. The mounting part is configured to be removably secured to a tool body of the power tool. The grip part is formed in an elongated hollow shape. The beam is supported by the handle body in a cantilever manner and extends within the grip part. The weight is supported by the beam.

In the above-described handle, the beam and the weight supported by the beam form a dynamic vibration absorber (dynamic vibration reducer) and thus vibration of the handle body can be reduced (suppressed, attenuated). The resonant frequency of the dynamic vibration absorber can be appropriately set (determined) by adjusting the rigidity of the beam and the mass of the weight. Further, setting/tuning the resonant frequency of the dynamic vibration absorber to be matched to excitation frequency, which is the frequency of the vibration inputted from the tool body of the power tool to the handle body via the mounting part, or to be close to the excitation frequency as much as possible, so that the vibration of the handle body can be effectively reduced. In a known vibration-isolating handle having an elastic member (for example, spring or rubber) that is interposed between a mounting part and a grip part of the handle, maneuverability of the handle may be deteriorated, depending on the spring constant of the elastic member. However, in the handle of this embodiment, the setting for the resonant frequency of the dynamic vibration absorber does not substantially affect the maneuverability of the handle, so that the beam and the weight can be relatively freely designed. In a case where the rotational speed of the motor is controlled to be substantially constant in the power tool, fluctuation of the excitation frequency can be reduced. Therefore, such control may be effective because the excitation frequency can be maintained within a range that is close to the resonant frequency of the dynamic vibration absorber as much as possible.

DESCRIPTION OF EMBODIMENTS

Figure 1:
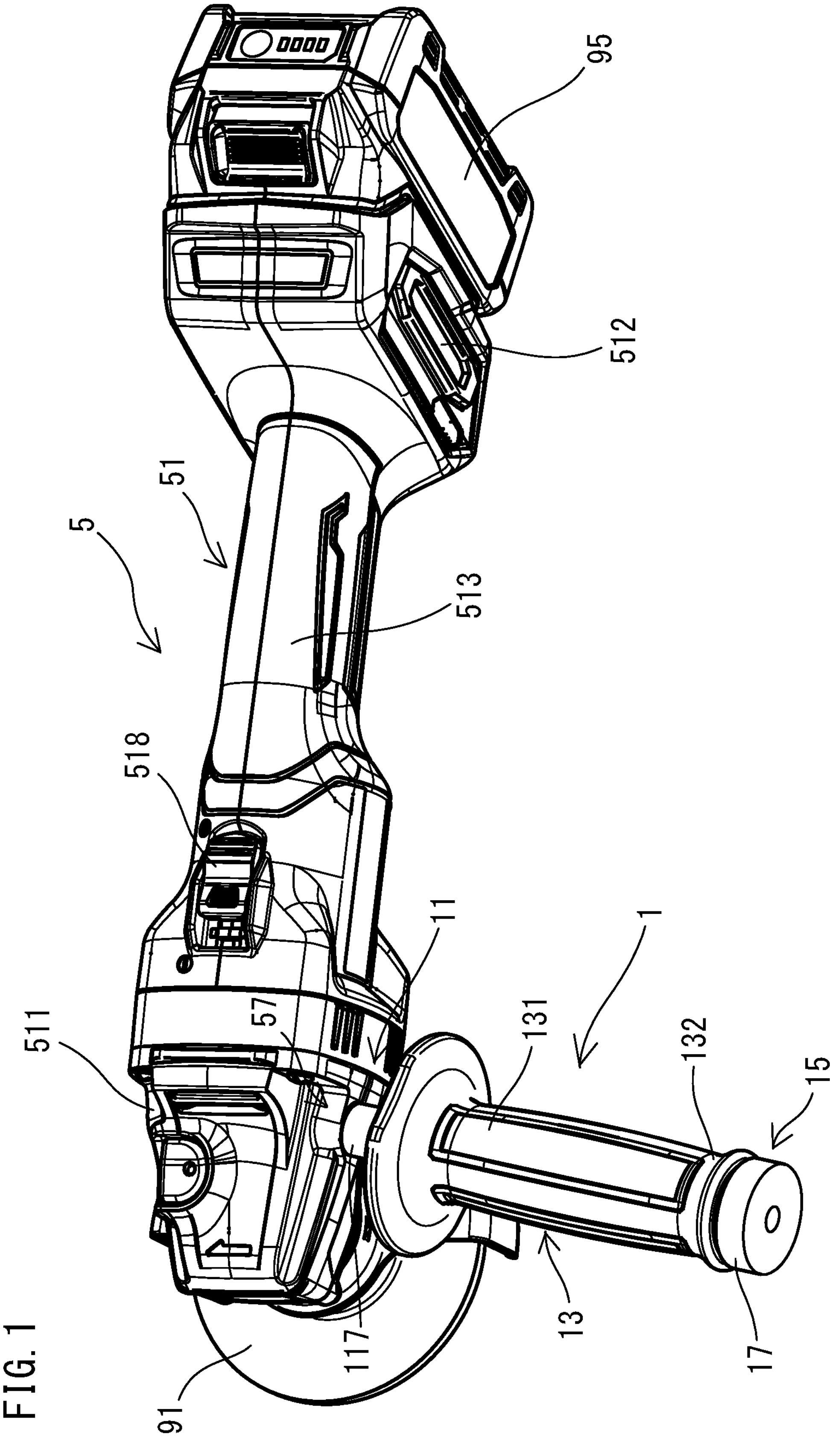
FIG. 1 is a perspective view of a grinder with an auxiliary handle of the first embodiment attached thereto.

In one non-limiting embodiment according to the present disclosure, the beam may be removably coupled to the handle body. According to this embodiment, the beam can be removed from the handle body and replaced with another (a different) beam. The frequency of the dominant vibration is different, depending on the type of the power tool. Therefore, a user can select a beam that can achieve the resonant frequency that is suitable for the excitation frequency of the power tool to which the handle is to be attached, and couple the beam to the handle body. Owing to this configuration, the handle body can be suitably used with various power tools.

In addition or in the alternative to the preceding embodiment, the weight may be supported by the beam such that a position of the weight in an extension direction of the beam is changeable. According to this embodiment, the resonant frequency of the dynamic vibration absorber can be changed in response to a change of the position of the weight on the beam. Thus, by changing the position of the weight on the beam, depending on the power tool to which the handle is to be attached, the handle can be made suitable for various power tools.

In addition or in the alternative to the preceding embodiments, the weight may be removably coupled to the beam. According to this embodiment, the weight can be removed from the handle body and replaced with another (a different) weight. Thus, a user can select a weight that can achieve the resonant frequency that is suitable for the excitation frequency of the power tool to which the handle is to be attached, and couple the weight to the beam. Owing to this configuration, the handle body can be suitably used with various power tools.

In addition or in the alternative to the preceding embodiments, the beam and the weight may be coupled to each other to form a single assembly. According to this embodiment, the beam and the weight can be integrally replaced, which facilitates replacing the beam and the weight.

In addition or in the alternative to the preceding embodiments, the grip part may have (i) a first end portion that is closer to the mounting part, and (ii) a second end portion that is farther from the tool body. The beam may be supported by the handle body at a position closer to the first end portion of the grip part than to the second end portion. The beam may extend in a first direction that is directed from the first end portion of the grip part toward the second end portion. According to this embodiment, the beam can be supported by the handle body in the vicinity of the mounting part, into which the vibration is inputted from the tool body (i.e., supported by a proximal portion of the handle body). Thus, the vibration of the proximal portion of the handle body can be effectively reduced.

In addition or in the alternative to the preceding embodiments, the weight may be supported by the beam outside of the second end portion of the grip part. According to this embodiment, the size and the shape of the weight can be more freely selected, compared to a configuration in which the weight is disposed within the grip part.

In addition or in the alternative to the preceding embodiments, the beam may be supported by the mounting part. According to this embodiment, the beam is supported by the mounting part into which the vibration is inputted from the tool body, so that the vibration can be effectively reduced.

In addition or in the alternative to the preceding embodiments, the grip part may have (i) a first end portion that is closer to the mounting part, and (ii) a second end portion that is farther from the tool body. The beam may be supported by the handle body at a position closer to the second end portion of the grip part than to the first end portion. The beam may extend in a second direction that is directed from the second end portion of the grip part toward the first end portion. According to this embodiment, the vibration of a portion of the handle body on which a little finger of the user is positioned when the user grips the grip part can be effective reduced.

In addition or in the alternative to the preceding embodiments, the beam may have different elastic deformation properties (deflection properties) in different directions. According to this embodiment, by arranging the beam such that the direction of the dominant vibration of the power tool coincides with the direction in which the beam is easily elastically deformable (deflectable), the vibration of the handle body can be effectively reduced.

Representative, non-limiting embodiments of the present disclosure are now described in detail with reference to the drawings.

First Embodiment

An auxiliary handle 1 according to a first embodiment of the present disclosure and a grinder 5, which is an example of a power tool to which the auxiliary handle 1 is attachable, are described with reference to FIGS. 1 to 4. The auxiliary handle 1 is configured to be removably attached (mounted, coupled) to the grinder 5. The auxiliary handle 1 may also be referred to as a side handle or a side grip. The auxiliary handle 1 is additionally attached to the grinder 5 as needed and is gripped by a user so that the user can stably hold and operate the grinder 5. The grinder 5 is an example of a rotary tool that is configured to rotationally drive a tool accessory 91 around a driving axis DX.

The grinder 5 is now described. The structure of the grinder 5 is well-known and thus it is only briefly described.

Figure 2:
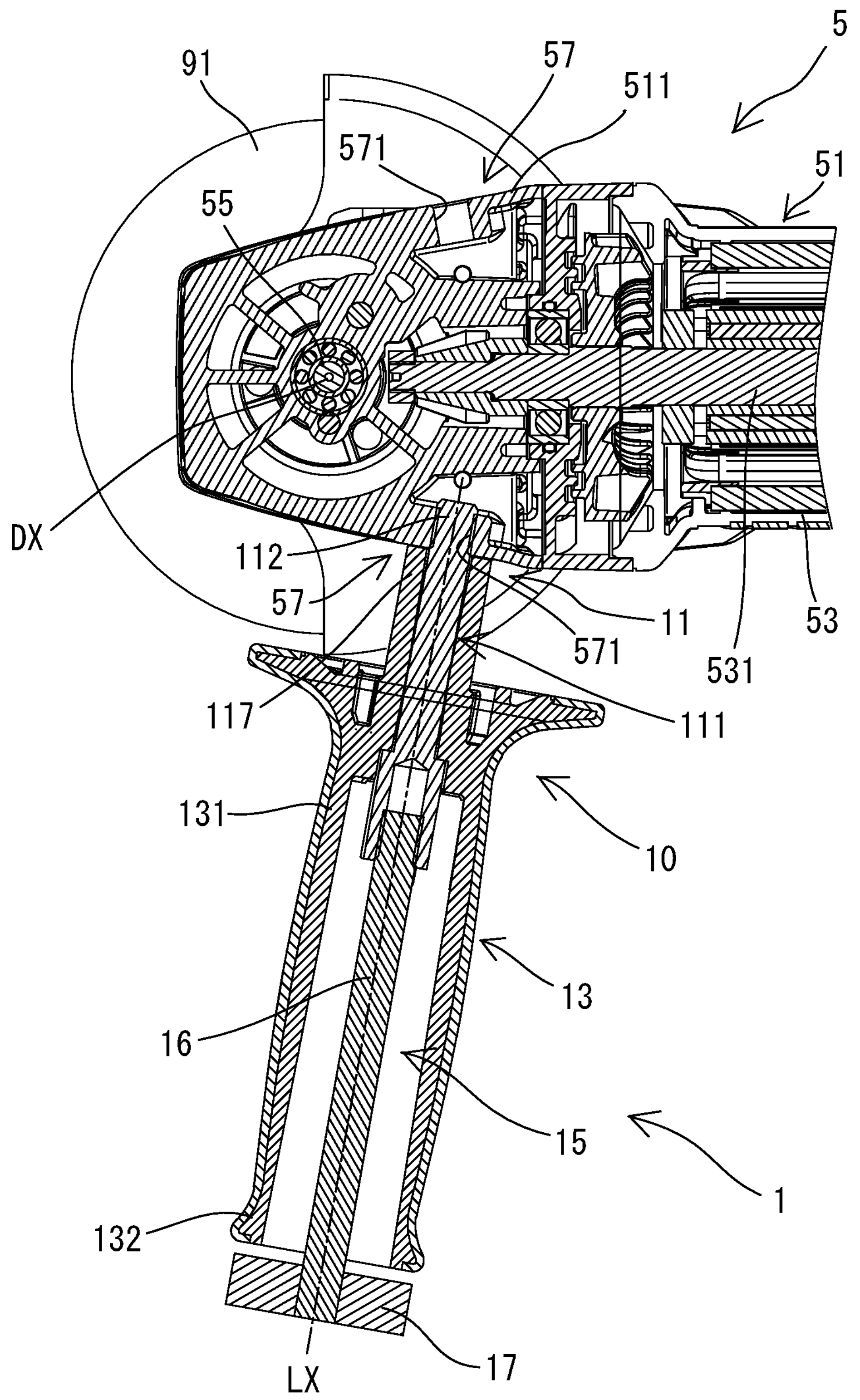
FIG. 2 is a partial sectional view of the grinder with the auxiliary handle attached thereto.
Figure 3:
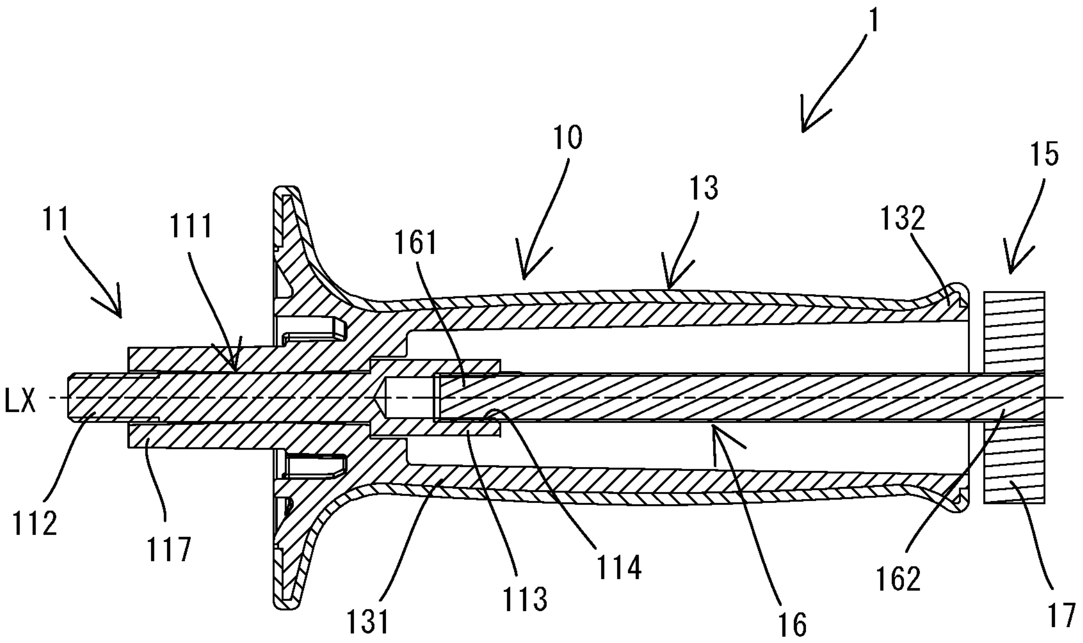
FIG. 3 is a sectional view of the auxiliary handle.
Figure 4:
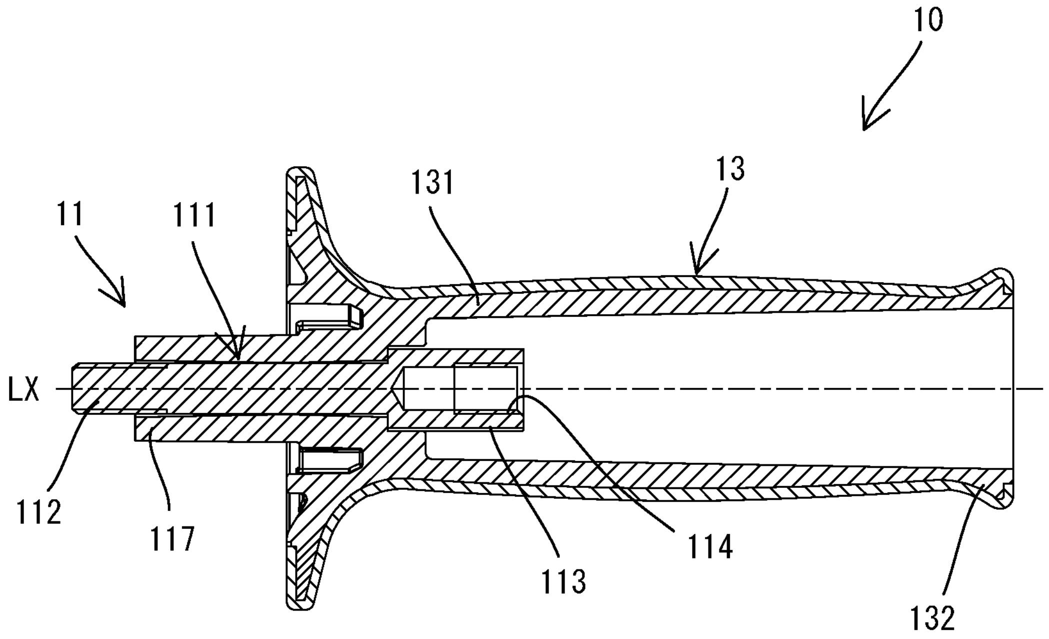
FIG. 4 is a sectional view of a handle body.

As shown in FIGS. 1 and 2, the grinder 5 mainly includes a tool body (also referred to as a housing) 51, a motor 53, and a spindle 55 that is operably coupled to the motor 53.

The tool body 51 is an elongate hollow body. One end portion of the tool body 51 in its longitudinal direction (hereinafter referred to as a first end portion 511) houses the spindle 55. The spindle 55 is an elongate member and is supported to be rotatable around the driving axis DX of the tool body 51. The driving axis DX extends in a direction that intersects a longitudinal axis of the tool body 51. The motor 53 is disposed adjacent to the spindle 55 such that a rotational axis of an output shaft 531 of the motor 53 intersects the driving axis DX. A tool accessory 91 (for example, a grinding stone, a rubber pad, a brush, or a blade) is selectively secured to one end portion of the spindle 55 in its axial direction.

A battery 95 for supplying electric power to the motor 53 is removably mounted on the other end portion of the tool body 51 in its longitudinal direction (hereinafter referred to as a second end portion 512). A substantially central portion of the tool body 51 in the longitudinal direction of the tool body 51 is configured as a grip part 513 to be gripped by the user. A manipulation member 518 is disposed on the first end portion 511. When the manipulation member 518 is moved to an ON position by the user, the motor 53 is driven. The spindle 55 is rotationally driven by power transmitted from the output shaft 531 of the motor 53 and a processing operation such as grinding, sanding, polishing and cutting is performed on a workpiece by the tool accessory 91 secured to the spindle 55.

The auxiliary handle 1 can be selectively attached (mounted, coupled) to the first end portion 511 of the tool body 51. Specifically, the first end portion 511 includes two receiving parts 57 that are each configured to removably receive a mounting part 11 of the auxiliary handle 1. The receiving part 57 of this embodiment has a threaded hole 571 that is configured to engage with (specifically, threadedly engage with) a mounting shaft 111 of the mounting part 11 of the auxiliary handle 1. In this embodiment, the receiving parts 57 are on both sides of a plane that contains the driving axis DX and the rotational axis of the output shaft 531. Thus, the user can attach the auxiliary handle 1 to selected one of the two receiving parts 57, depending on the user's dominant hand or a working environment.

Next, the auxiliary handle 1 is described.

As shown in FIGS. 1 to 4, the auxiliary handle 1 of this embodiment is basically an elongate member having a longitudinal axis LX. The auxiliary handle 1 includes a handle body 10 that includes the mounting part 11 and a grip part 13, and a dynamic vibration absorber (dynamic vibration reducer) 15 that includes a beam 16 and a weight 17.

The mounting part 11 is a portion of the auxiliary handle 1 that is configured to be removably secured to the receiving part 57 of the tool body 51 (the first end portion 511). The mounting part 11 includes the mounting shaft 111 and a contact part 117.

The mounting shaft 111 is configured to engage with (specifically, to be threaded into) the threaded hole 571 of the tool body 51 (the first end portion 511). The mounting shaft 111 is an elongate metal shaft and extends along the longitudinal axis LX. A first axial end portion of the mounting shaft 111 includes a threaded part 112 having a thread formed on its outer periphery. The contact part 117 has a tubular shape and is disposed around the first axial end portion of the mounting shaft 111 such that the threaded part 112 protrudes from an end of the contact part 117. When the threaded part 112 is threaded into the threaded hole 571 to a specified depth, the contact part 117 abuts an outer surface of the tool body 51 around the threaded hole 571. Thus, the mounting part 11 is positioned relative to the tool body 51 in the axial direction of the auxiliary handle 1 and thus the auxiliary handle 1 is secured to the tool body 51 in a stable manner.

The auxiliary handle 1 can be attached not only to the grinder 5 of this embodiment, but also to a power tool of other type that has the receiving part 57 (i.e., the threaded hole 571), similarly to the grinder 5.

The grip part 13 is a portion of the auxiliary handle 1 that is configured to be gripped by the user. The grip part 13 is coupled to the mounting part 11 and extends along the longitudinal axis LX to be coaxial with the mounting shaft 111. The grip part 13 is basically an elongate tubular body (a hollow body). In the following description, one of two axial end portions of the grip part 13 (i.e. one of the two end portions in an extension direction of the longitudinal axis LX) that is closer to the mounting part 11 is referred to as a first end portion 131, and the other end portion that is farther from the mounting part 11 is referred to as a second end portion 132. In other words, when the auxiliary handle 1 is attached to the tool body 51, the first end portion 131 is closer to the tool body 51 than the second end portion 132 and the second end portion 132 is farther away from the tool body 51 than the first end portion 131. The second end portion 132 defines a free end of the grip part 13.

In this embodiment, the contact part 117 of the mounting part 11 and the grip part 13 are integrally molded from synthetic resin (polymeric/plastic material). The contact part 117 and the grip part 13 are fixed to the mounting shaft 111 in a substantially immovable manner. A second axial end portion of the mounting shaft 111 that is opposite to the threaded part 112 is within the first end portion 131 of the grip part 13. The second end portion of the mounting shaft 111 serves as a receiving part 113 that is configured to removably receive one axial end portion of the beam 16 of the dynamic vibration absorber 15. The receiving part 113 has a threaded hole 114 that is formed along the axis of the mounting shaft 111 (i.e. the longitudinal axis LX). The beam 16 of the dynamic vibration absorber 15 is engageable (specifically, threadedly engageable) with the threaded hole 114, as will be described in detail later.

Generally, a dynamic vibration absorber includes a spring element and a mass and is configured to be added to an object (a target) in order to reduce (suppress, attenuate) vibration of the object (target). The dynamic vibration absorber 15 of this embodiment is configured as a cantilever-type dynamic vibration absorber. Specifically, the dynamic vibration absorber 15 includes the beam 16 and the weight 17 supported by the beam 16. The beam 16 is a cantilever beam that has a first axial end that is supported and a second axial end that defines a free end. In the following description, among the two axial end portions of the beam 16, the end portion having the supported end (the first axial end) is referred to as a first end portion 161 and the other end portion having the free end (second axial end) is referred to as a second end portion 162.

The beam 16 is configured to serve as the spring element of the dynamic vibration absorber 15. The beam 16 of this embodiment is an elongate metal shaft that is shaped as a round bar. The first end portion 161 of the beam 16 is removably secured to the mounting shaft 111. More specifically, a thread is formed on an outer periphery of the beam 16 over an entire length of the beam 16. In another embodiment, however, the thread may be formed only around the first end portion 161 and the second end portion 162 of the beam 16. Each of the first end portion 161 and the second end portion 162 of the beam 16 serves as a threaded part. When the first end portion 161 of the beam 16 is engaged with (threaded into) the threaded hole 114 of the receiving part 113 of the mounting shaft 111, the beam 16 is supported by the mounting shaft 111 in a cantilever manner so as to extend in the grip part 13 along the longitudinal axis LX. An axial length of the beam 16 is set such that the second end portion 162 of the beam 16 protrudes outside of the second end portion 132 of the grip part 13 when the first end portion 161 of the beam 16 is threaded into the threaded hole 114 to its maximum depth.

The weight 17 is configured to serve as a mass (an auxiliary/additional mass) in the dynamic vibration absorber 15. The weight 17 of this embodiment is originally separate (discrete) from the beam 16 and is removably coupled to the beam 16. More specifically, the weight 17 is a hollow cylindrical metal member having a thread formed on its inner periphery. The weight 17 is engaged (threaded) with the second end portion 162 of the beam 16 outside of the grip part 13.

The resonant frequency of the dynamic vibration absorber 15 is set based on the frequency of the vibration (an excitation frequency) inputted into the mounting part 11 from the tool body 51. In order to effectively reduce the vibration, the resonant frequency of the dynamic vibration absorber 15 is set to be matched to (tuned to) the excitation frequency or to be close to the excitation frequency as much as possible. Specifically, the resonant frequency of the dynamic vibration absorber 15 can be appropriately set (designed) by adjusting the rigidity of the beam 16 and the mass of the weight 17. For example, a material and/or structure (for example, the length, thickness, and/or cross-sectional shape) of the beam 16, and a material and/or structure (for example, the shape) of the weight 17 may be considered. Therefore, the material and/or structure of the beam 16 and/or the weight 17 is not limited to the above-described examples and may be appropriately changed.

In a known vibration-isolating handle having at least one elastic member (for example, spring, or rubber) interposed between a mounting part and a grip part of the handle, the elastic member can reduce transmission of vibration from the mounting part to the grip part. In such a vibration-isolating handle, when the spring constant of the elastic member is made relatively small in order to obtain the maximum effect, maneuverability of the handle may be deteriorated. On the other hand, in the auxiliary handle 1 of this embodiment, the setting (parameters) for the resonant frequency of the dynamic vibration absorber 15 does not substantially affect the maneuverability of the auxiliary handle 1, so that the beam 16 and the weight 17 can be relatively freely designed. In particular, in this embodiment, the weight 17 is disposed outside of the grip part 13, so that the size and shape of the weight 17 can be more freely designed, compared to another embodiment in which the weight 17 is disposed within the grip part 13.

When a processing operation is performed by the grinder 5 with the auxiliary handle 1 attached thereto, the tool body 51 is vibrated in response to driving of the motor 53 and the spindle 55. Although the vibration of the tool body 51 is transmitted to the auxiliary handle 1 via the mounting part 11, the dynamic vibration absorber 15 can effectively reduce the vibration of the handle body 10. When the rotational speed of the motor 53 is controlled in the grinder 5 such that it is substantially constant, fluctuation of the excitation frequency can be reduced. Therefore, controlling the rotational speed of the motor 53 in this manner can maintain the excitation frequency within a range that is close to the resonant frequency of the dynamic vibration absorber as much as possible and is thus effective.

In this embodiment, the beam 16 is supported by the mounting shaft 111 at a position that is closer to the first end portion 131 of the grip part 13 than to the second end portion 132. Thus, the beam 16 is supported on a portion of the handle body 10 that is adjacent to the mounting part 11 (i.e., at a proximal end portion), into which the vibration is inputted from the tool body 51. Consequently, the vibration on the proximal end portion of the handle body 10 can be effectively reduced. In particular, in this embodiment, the beam 16 is supported by the mounting shaft 111, into which the vibration is input from the tool body 51, so that the vibration of the mounting part 11 can be effectively reduced.

In this embodiment, the beam 16 of the dynamic vibration absorber 15 can be removed from the handle body 10 and replaced with a different beam 16. Further, the weight 17 can be removed from the beam 16 and replaced with a different weight 17. The frequency of the dominant vibration is different, depending on the type of the power tool. Therefore, the user can selectively employ the different beam 16 and/or the different weight 17 that can achieve a resonant frequency that is suitable for the excitation frequency of the power tool to which the auxiliary handle 1 is to be attached, so that the handle body 10 can be suitably used with various power tools. In a state in which the weight 17 is coupled to the second end portion 162 of the beam 16, the beam 16 and the weight 17 form a single dynamic vibration absorber assembly. Therefore, when the user replaces both of the beam 16 and the weight 17, the user can handle the beam 16 and the weight 17 integrally (i.e., as a single unit). This configuration facilitates removing/attaching the beam 16 and the weight 17 from/to the handle body 10.

The receiving part 113 of the mounting shaft 111 and the first end portion 161 of the beam 16 are coupled (connected) to each other by way of threaded engagement. The second end portion 162 of the beam 16 and the weight 17 are also coupled (connected) to each other by way of threaded engagement. Thus, the beam 16 and/or the weight 17 can be easily replaced. In addition, the position of the weight 17 in the extension direction (the axial direction) of the beam 16 can be easily changed. In this embodiment, a range in which the position of the weight 17 relative to the beam 16 can be changed is very small and thus the substantial change in the position of the weight 17 may be difficult. However, in another embodiment, the beam 16 may be made longer, so that the position of the weight 17 can be changed in a wider range. The resonant frequency of the dynamic vibration absorber 15 can be changed by changing the position of the weight 17 on the beam 16 without replacing the beam 16 and/or the weight 17. Thus, by appropriately changing the position of the weight 17 on the beam 16, the auxiliary handle 1 can be made suitable for various types of power tools that have different dominant vibration frequencies.

Second Embodiment

Figure 5:
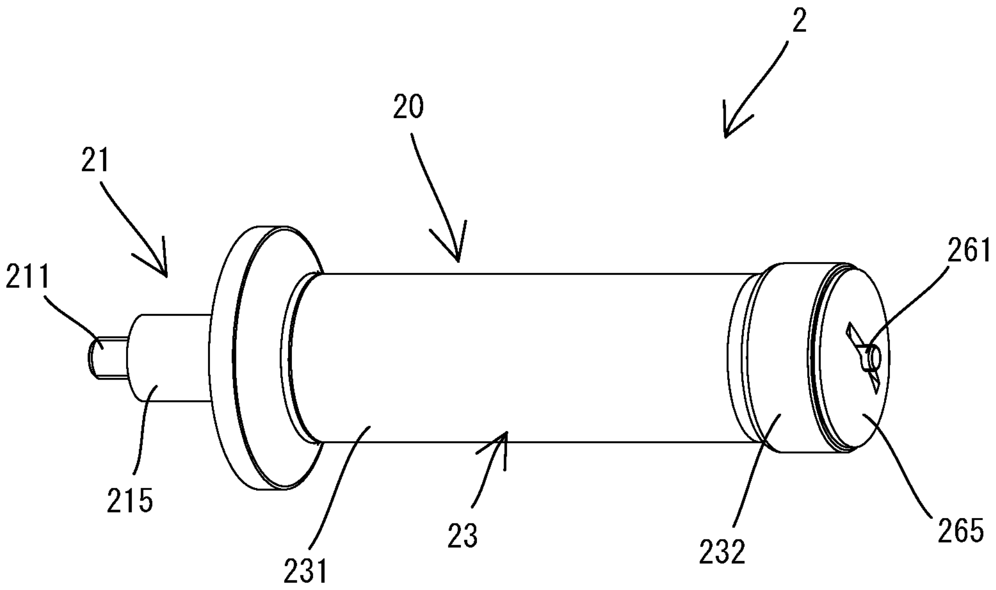
FIG. 5 is a perspective view of an auxiliary handle of the second embodiment.
Figure 6:
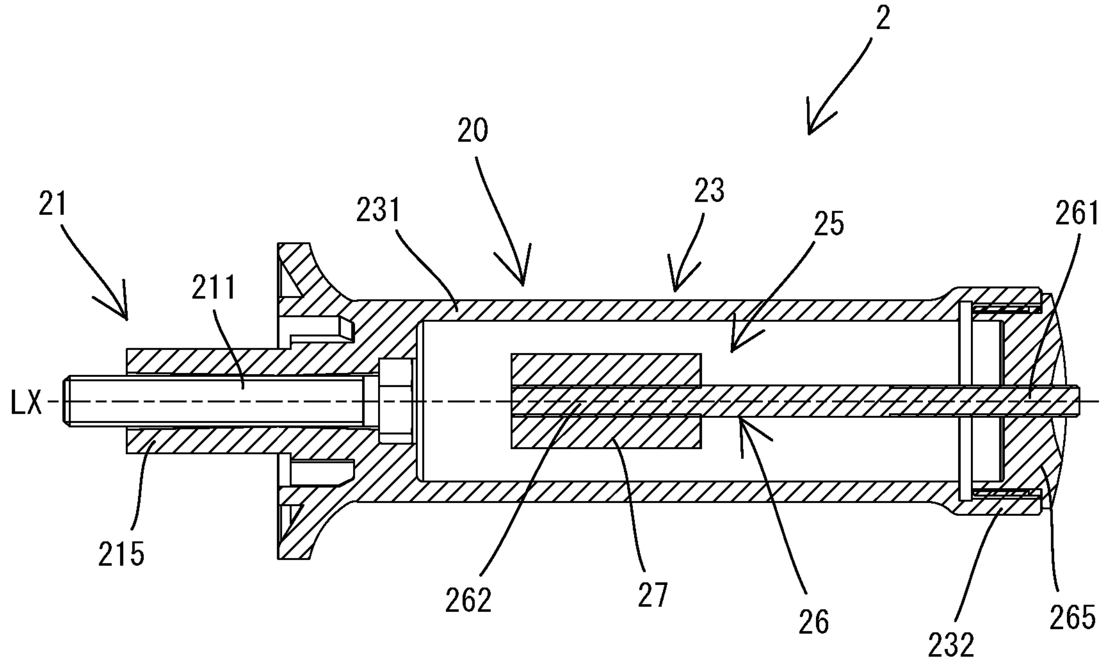
FIG. 6 is a sectional view of the auxiliary handle.

An auxiliary handle 2 according to a second embodiment of the present disclosure is described with reference to FIGS. 5 and 6. Similarly to the auxiliary handle 1 of the first embodiment, the auxiliary handle 2 is a handle (a side handle or a side grip) that is configured to be removably attached (mounted, coupled) to the grinder 5.

Similarly to the auxiliary handle 1, the auxiliary handle 2 of this embodiment is basically an elongate member having a longitudinal axis LX. The auxiliary handle 2 includes a handle body that includes a mounting part 21 and a grip part 23, and a dynamic vibration absorber (dynamic vibration reducer) 25 that includes a beam 26 and a weight 27.

The mounting part 21 of the handle body 20 is configured to be removably secured to the receiving part 57 of the tool body 51 (the first end portion 511) (see FIG. 2). The mounting part 21 includes a mounting bolt 211 and a contact part 215.

The mounting bolt 211 is configured to engage (specifically, threadedly engage) with the threaded hole 571 of the tool body 51 (the first end portion 511). The mounting bolt 211 extends along the longitudinal axis LX. The contact part 215 has a tubular shape and is disposed around one axial end portion of the mounting bolt 211 such that a distal end portion of the mounting bolt 211 protrudes from one axial end of the contact part 215. The contact part 215 functions similarly to the contact part 117 of the auxiliary handle 1.

The grip part 23 is coupled to the mounting part 21 and extends along the longitudinal axis LX. Also in this embodiment, the contact part 215 of the mounting part 21 and the grip part 23 are integrally molded from synthetic resin. The mounting bolt 211 is fixed to the contact part 215 and the grip part 23 to be non-rotatable relative to the contact part 215 and the grip part 23. The grip part 23 is basically an elongate tubular body (a hollow body). The grip part 23 has a first end portion 231 that is closer to the mounting part 21 and a second end portion 232 that is farther from the mounting part 21. The second end portion 232 is configured as a threaded part having a thread formed on its inner periphery.

Similarly to the dynamic vibration absorber 15 of the first embodiment, the dynamic vibration absorber 25 is a cantilever-type dynamic vibration absorber. Specifically, the dynamic vibration absorber 25 includes the cantilever beam 26 that serves as a spring element, and the weight 27 that serves as a mass (an auxiliary/additional mass).

The beam 26 is an elongate metal shaft having a round-bar shape. The beam 26 has a first end portion 261 having a supported end and a second end portion 262 having a free end. Unlike the dynamic vibration absorber 15 of the first embodiment, in this embodiment, the first end portion 261 of the beam 26 is supported by the second end portion 232 of the grip part 23. More specifically, the first end portion 261 of the beam 26 is fixed to a support member 265 and is supported by the second end portion 232 via the support member 265. The support member 265 is a disc-like member and is removably engaged with the second end portion 232 (threadedly engaged with the threaded part) of the grip part 23. The support member 265 substantially closes an opening of the second end portion 232 of the grip part 23. The first end portion 261 of the beam 26 is fixed to a central portion of the support member 265. The beam 26 extends along the longitudinal axis LX within the grip part 13.

The axial length of the beam 26 is set such that the second end portion 262 of the beam 26 is within the first end portion 231 of the grip part 23 and such that the second end portion 262 does not contact the mounting part 21 (the mounting bolt 211). A thread is formed on an outer periphery of the beam 26 over an entire length of the beam 26. In another embodiment, however, the thread may be formed only on a portion of the beam 26 (a portion extending within the grip part 23) other than the first end portion 261.

The weight 27 is originally separate (discrete) from the beam 26 and is removably secured to the beam 26. More specifically, the weight 27 is a hollow cylindrical metal member having a thread formed on an inner periphery. The weight 27 is engaged (threadedly engaged) with the beam 26 within the grip part 23. Thus, the user can change the position of the weight 27 on the beam 26 easily by rotating the weight 27 relative to the beam 26.

Also in this embodiment, the resonant frequency of the dynamic vibration absorber 25 is set (designed) based on the excitation frequency. The improved degrees of freedom in the design and the vibration-reducing effect of the dynamic vibration absorber 25 having the beam 26 and the weight 27 are similar to those of the dynamic vibration absorber 15 of the first embodiment. It is noted, however, in this embodiment, the shape of the weight 27 needs to be designed such that the weight 27 will not contact the inner periphery of the grip part 23, considering a displacement of the beam 26 that acts (deflects) as a spring element.

Further, in this embodiment, the beam 26 is supported by the second end portion 232 of the grip part 23 via the support member 265. Thus, the vibration of a portion of the handle body 20 on which a little finger of the user is positioned when the user grips the grip part 23 can be effectively reduced. Accordingly, an effective vibration reduction can be achieved for the user who firmly grips this portion.

Also in this embodiment, the beam 26 and the weight 27 of the dynamic vibration absorber 25 can be easily replaced with a different beam 26 and a different weight 27. Thus, the handle body 20 can be applied to various power tools by replacing the beam 26 and/or the weight 27. In a state in which the weight 27 is coupled to the beam 26, the support member 265, the beam 26 and the weight 27 form a single dynamic vibration absorber assembly. This configuration facilitates removing/attaching the beam 26 and the weight 27 (assembly) from/to the handle body 20. Further, the support member 265 is coupled to the grip part 23 by way of threaded engagement. This configuration also facilitates the replacement of the beam 26 and the weight 27 (assembly).

Further, in this embodiment, the resonant frequency of the dynamic vibration absorber can be adjusted by changing the position of the weight 27 on the beam 26 without replacing the assembly. Thus, by appropriately changing the position of the weight 27 on the beam 26, the handle body 20 can be made suitable for various types of power tools that have different dominant vibration frequencies.

Third Embodiment

An auxiliary handle 3 according to the third embodiment of the present disclosure is described with reference to FIG. 7. The auxiliary handle 3 is a handle (a side handle or a side grip) that is configured to be removably attached (mounted, coupled) to a rotary hammer 6, which is another example of a power tool. The rotary hammer 6 is an example of a power tool having a hammer mechanism or a rotary tool that is capable of performing a hammering action of linearly driving a tool accessory (not shown) along a driving axis DX and a rotary action of rotationally driving the tool accessory around the driving axis DX.

The rotary hammer 6 is now described. The structure of the rotary hammer 6 is well-known and thus it is only briefly described.

Figure 7:
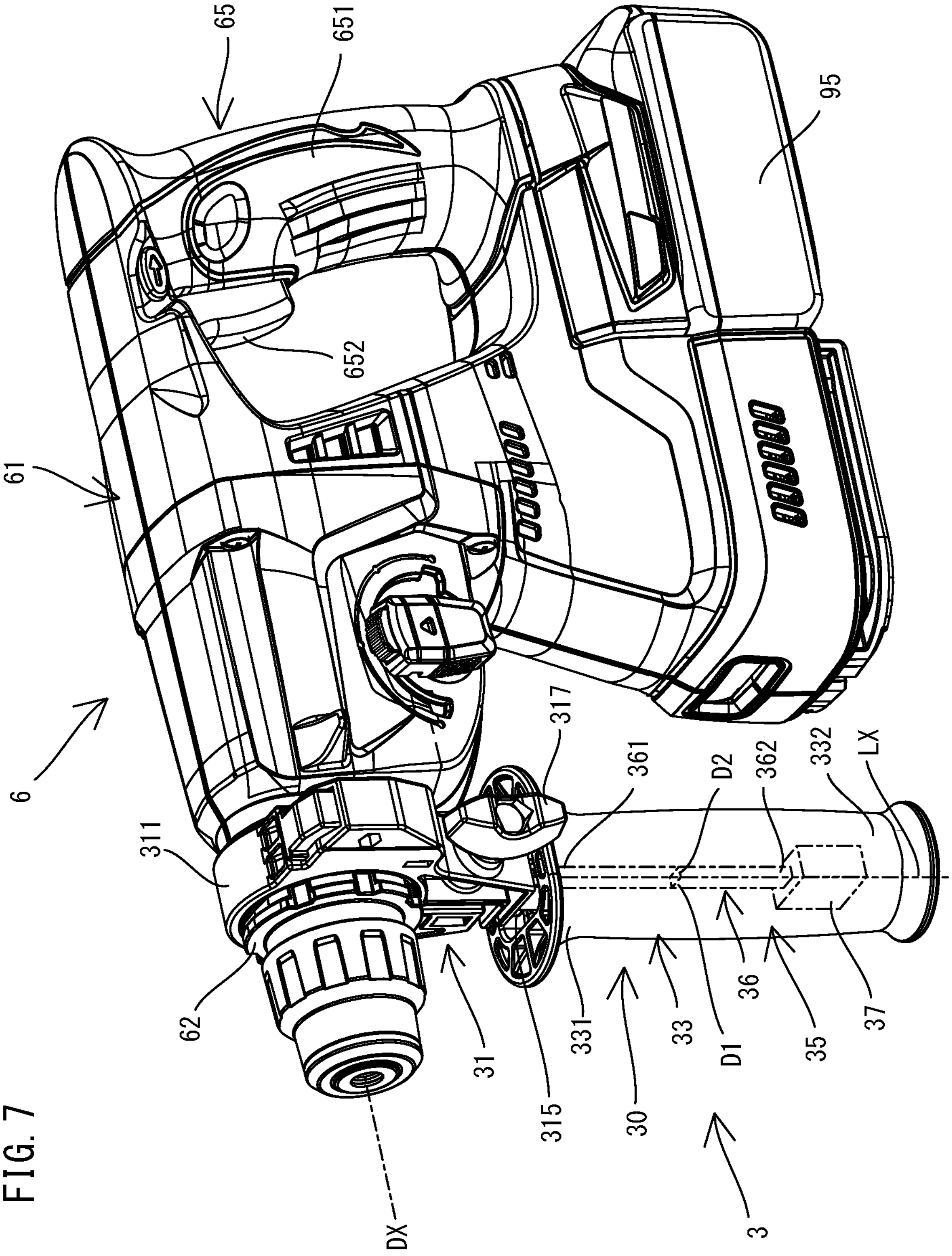
FIG. 7 is a perspective view of a rotary hammer with an auxiliary handle of the third embodiment attached thereto.

As shown in FIG. 7, the rotary hammer 6 includes a tool body (also referred to as a housing) 61 and a main handle 65 that is coupled to the tool body 61. A portion of the tool body 61 that houses a tool holder has a cylindrical shape and is referred to as a barrel part 62. The auxiliary handle 3 can be selectively attached to the barrel part 62 for use with the rotary hammer 6. The main handle 65 includes a grip part 651 that is configured to be gripped by a user. Although not shown in the drawing as being well-known, the tool body 61 houses a motor and a driving mechanism that is operably coupled to the motor. The tool accessory is held by the tool holder disposed in the tool body 61 so as to extend along the driving axis DX. When a trigger 652 disposed on the grip part 651 is depressed by the user, the motor is driven and thus a processing operation is performed on a workpiece by the tool accessory.

Next, the auxiliary handle 3 is described.

As shown in FIG. 7, similarly to the auxiliary handles 1 and 2, the auxiliary handle 3 of this embodiment is basically an elongate member having a longitudinal axis LX. The auxiliary handle 3 includes a handle body 30 that includes a mounting part 31 and a grip part 33, and a dynamic vibration absorber (dynamic vibration reducer) 35 that includes a beam 36 and a weight 37.

The mounting part 31 of the handle body 30 is configured to be removably secured to an outer periphery of the barrel part 62 of the tool body 61. The mounting part 31 includes an annular part 311 and a base part 315 that are integrally molded from synthetic resin. The annular part 311 is formed in an annular shape with a cut portion (specifically, a cut in a lower portion) in its circumferential direction. In other words, the annular part 311 has a C-shape. The annular part 311 is configured such that a gap formed by the cut can be changed when the user rotates a manipulation part 317. The base part 315 protrudes radially outward from the annular part 311. The user inserts the barrel part 62 into the annular part 311 and rotates the manipulation part 317, so that the annular part 311 is tightened and secured around the barrel part 62.

The grip part 33 is coupled to the mounting part 31 and extends along the longitudinal axis LX. In this embodiment, the mounting part 31 and the grip part 33 are integrally molded from synthetic resin. The grip part 33 is basically an elongate tubular body (a hollow body). The grip part 33 has a first end portion 331 that is closer to the mounting part 31 and a second end portion 332 that is farther from the mounting part 31.

Similarly to the dynamic vibration absorbers 15 and 25, the dynamic vibration absorber is configured as a cantilever-type dynamic vibration absorber. The dynamic vibration absorber includes the cantilever beam 36 that serves as a spring element, and the weight 37 that serves as a mass (an auxiliary/additional mass).

A first end portion 361 having a supported end of the beam 36 is immovably fixed to and supported by the base part 315 of the mounting part 31. The beam 36 extends along the longitudinal axis LX within the grip part 33. The beam 36 of this embodiment has different elastic deformation properties (deflection properties) in different directions (direction-dependent elastic deformation/deflection properties). In other words, the beam 36 has properties that the beam 36 is more easily elastically deformable (deflectable, bendable) in a specific direction/directions than in other directions. More specifically, the beam 36 is an elongate rectangular bar. A cross-sectional shape of the beam 36 is substantially a rectangle that has long sides having a length D1 and short sides having a length D2 that is shorter than the length D1 (i.e., D1>D2). Thus, the beam 36 is more easily deflectable in an extension direction of the short sides of the rectangle.

In this embodiment, the beam 36 is fixed to the mounting part 31 such that the extension direction of the short sides of the cross-section of the beam 36 substantially coincides with an extension direction of the driving axis DX when the auxiliary handle 3 is attached to the tool body 51. In the rotary hammer 6, the largest and most dominant vibration is generated in the extension direction of the driving axis DX during the hammering action. Thus, owing to the beam 36 that is easily deflectable in the extension direction of the driving axis DX, the dynamic vibration absorber can effectively cope with the dominant vibration that is generated during the hammering action.

The weight 37 of this embodiment is fixed to a second end portion 362 of the beam 36 and is unremovable (inseparable) from the beam 36. The weight 37 is disposed within the second end portion 332 of the grip part 33.

Also in this embodiment, the resonant frequency of the dynamic vibration absorber 35 is set based on the excitation frequency. The improved degrees of freedom in the design and the vibration-reducing effect of the dynamic vibration absorber 35 having the beam 36 and the weight 37 are similar to those of the dynamic vibration absorbers 15 and 25. It is noted that, similarly to the dynamic vibration absorber 25, the shape of the weight 37 needs to be designed such that the weight 37 will not contact the inner periphery of the grip part 33, considering a displacement of the beam 36 that acts (deflects) as a spring element.

The above-described embodiments are merely exemplary and the handle and the power tool according to the present disclosure are not limited to the auxiliary handles 1, 2 and 3, the grinder 5 and the rotary hammer 6 of the above-described embodiments. For example, the following non-limiting modifications may be made. Further, at least one of these modifications may be employed in combination with at least one of the auxiliary handles 1, 2 and 3, the grinder 5, the rotary hammer 6 of the above-described embodiments, and the claimed features.

Non-limiting, additional examples of the power tool to which the handle according to the present disclosure is attachable may include an electric hammer, a circular saw, an impact wrench, a driver drill, a hedge trimmer, and a brush cutter. Any known structure may be employed for the mounting part, as long as the structure makes it possible for the handle to be removably attached (mounted, coupled) to the tool body of the power tool. For example, the mounting part of the handle may include a belt and configured to be removably secured around a cylindrical barrel part of the tool body of the power tool using the belt.

Any one of the dynamic vibration absorbers 15, 25 and 35 may be partly modified, or any feature of the dynamic vibration absorbers 15, 25 and 35 may be replaced with a feature of another one of the dynamic vibration absorbers 15, 25 and 35.

For example, the beam 16 of the dynamic vibration absorber 15 (see FIG. 3) may be unremovable (inseparable) from the handle body 10. Alternatively, the beam 16 may be removably attached (mounted, coupled) to the handle body 10 using any method other than the threaded engagement. Similarly, the weight 17 may be unremovable from the beam 16. Alternatively, the weight 17 may be attached (mounted, coupled) to the beam 16 using any method other than the threaded engagement such that the position of the weight 17 on the beam 16 is changeable or the weight 17 is removable (inseparable) from the beam 16. The similar modifications may be employed in the dynamic vibration absorber 25 (see FIG. 6). The weight 17 of the dynamic vibration absorber 15 (see FIG. 3) may be supported by the beam 16 within the grip part 13 such that the position of the weight 17 on the beam 16 is changeable or unchangeable. Similarly to the beams 16 and 26, the beam 36 of the dynamic vibration absorber 35 (see FIG. 7) may be removably attached (mounted, coupled) to the handle body 30. Similarly, the weight 37 may be removably attached (mounted, coupled) to the beam 36. Further, the weight 37 may be supported by the second end portion 362 of the beam 36 outside of the second end portion 332 of the grip part 33.

In view of the nature of the present invention and the above-described embodiments, the following Aspects can be provided. Any one or more of the following Aspects can be employed in combination with any one or more of the above-described embodiments, the above-described modifications and the claimed features.

ASPECT 1

The grip part is a tubular member having a longitudinal axis, and the beam extends along the longitudinal axis of the grip part.

ASPECT 2

The beam is coupled (connected) to the mounting part or to the grip part by way of threaded engagement.

ASPECT 3

The weight is coupled (connected) to the beam by way of threaded engagement.

DESCRIPTION OF THE REFERENCE NUMERALS

1: auxiliary handle, 10: handle body, 11: mounting part, 111: mounting shaft, 112: threaded part, 113: receiving part, 114: threaded hole, 117: contact part, 13: grip part, 131: first end portion, 132: second end portion, 15: dynamic vibration absorber, 16: beam, 161: first end portion, 162: second end portion, 17: weight, 2: auxiliary handle, 20: handle body, 21: mounting part, 211: mounting bolt, 215: contact part, 23: grip part, 231: first end portion, 232: second end portion, 25: dynamic vibration absorber, 26: beam, 261: first end portion, 262: second end portion, 265: support member, 27: weight, 3: auxiliary handle, 30: handle body, 31: mounting part, 311: annular part, 315: base part, 317: manipulation part, 33: grip part, 331: first end portion, 332: second end portion, 35: dynamic vibration absorber, 36: beam, 361: first end portion, 362: second end portion, 37: weight, 5: grinder, 51: tool body, 511: first end portion, 512: second end portion, 513: grip part, 518: manipulation member, 53: motor, 531: output shaft, 55: spindle, 57: receiving part, 571: threaded hole, 6: rotary hammer, 61: tool body, 62: barrel part, 65: main handle, 651: grip part, 652: trigger, 91: tool accessory, 95: battery, DX: driving axis, LX: longitudinal axis

What is claimed is:

1. A handle for use with a power tool, the handle comprising:

a handle body that includes (i) a mounting part configured to be removably secured to a tool body of the power tool, and (ii) an elongated hollow grip part fixed to the mounting part to be substantially immovable relative to the mounting part;

a beam that is supported by the handle body in a cantilever manner and that extends within the grip part; and a weight that is supported by the beam, wherein:

the beam has (i) a first end portion that is coupled to the handle body and (ii) a second end portion that is opposite to the first end portion and has a free end of the beam, and the weight is (i) supported on the second end portion of the beam and (ii) movable with the beam in a direction that intersects a longitudinal axis of the grip part while the weight is spaced apart from the grip part.

2. The handle as defined in claim 1, wherein the beam is removably coupled to the handle body.

3. The handle as defined in claim 1, wherein the weight is supported by the beam such that a position of the weight in an extension direction of the beam is changeable.

4. The handle as defined in claim 1, wherein the weight is removably coupled to the beam.

5. The handle as defined in claim 1, wherein the beam and the weight are coupled to each other to form a single assembly.

6. The handle as defined in claim 1, wherein:

the grip part has (i) a first end portion that is closer to the mounting part and (ii) a second end portion that is farther from the tool body, the beam is supported by the handle body at a position closer to the first end portion of the grip part than to the second end portion, and the beam extends in a first direction that is directed from the first end portion of the grip part toward the second end portion.

7. The handle as defined in claim 6, wherein the weight is supported by the beam outside of the second end portion of the grip part.

8. The handle as defined in claim 6, wherein the beam is supported by the mounting part.

9. The handle as defined in claim 1, wherein:

the grip part has (i) a first end portion that is closer to the mounting part and (ii) a second end portion that is farther from the tool body, the beam is supported by the handle body at a position closer to the second end portion of the grip part than to the first end portion, and the beam extends in a second direction that is directed from the second end portion of the grip part toward the first end portion.

10. The handle as defined in claim 1, wherein the beam has different elastic deformation properties in different directions.

11. The handle as defined in claim 2, wherein the weight is supported by the beam such that a position of the weight in an extension direction of the beam is changeable.

12. The handle as defined in claim 11, wherein the weight is removably coupled to the beam.

13. The handle as defined in claim 12, wherein:

the grip part has (i) a first end portion that is closer to the mounting part and (ii) a second end portion that is farther from the tool body, the beam is supported by the handle body at a position closer to the first end portion of the grip part than to the second end portion, and the beam extends in a first direction that is directed from the first end portion of the grip part toward the second end portion.

14. The handle as defined in claim 13, wherein the weight is supported by the beam outside of the second end portion of the grip part.

15. The handle as defined in claim 12, wherein:

the grip part has (i) a first end portion that is closer to the mounting part and (ii) a second end portion that is farther from the tool body, the beam is supported by the handle body at a position closer to the second end portion of the grip part than to the first end portion, and the beam extends in a second direction that is directed from the second end portion of the grip part toward the first end portion.

16. A power tool comprising:

a tool body; and the handle as defined in claim 1 that is removably attached to the tool body.

17. The handle as defined in claim 1, wherein:

the weight is coupled to the beam by threaded engagement such that a position of the weight in an the extension direction of the beam is changeable.

18. The handle as defined in claim 1, wherein the beam is removably coupled to the handle body by threaded engagement.

* * * * *